Dec. 24, 1957  R. SPARTZ  2,817,177
REEL
Filed May 13, 1955
FIG. 1.
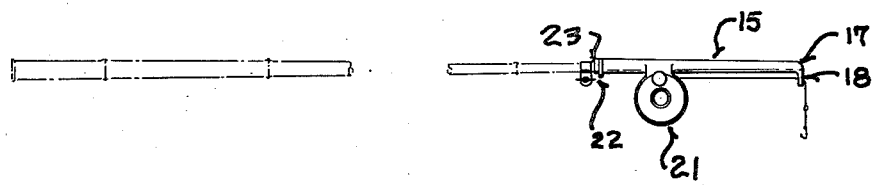
FIG. 2.
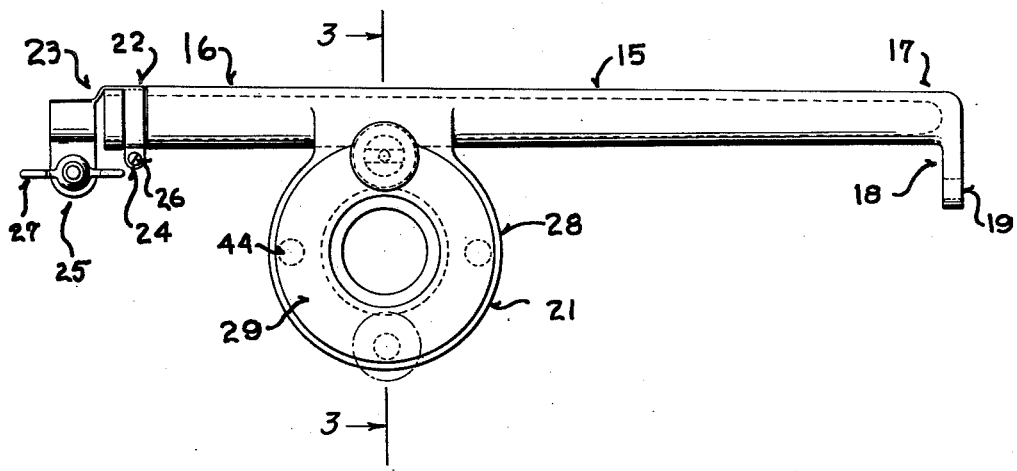
FIG. 3.
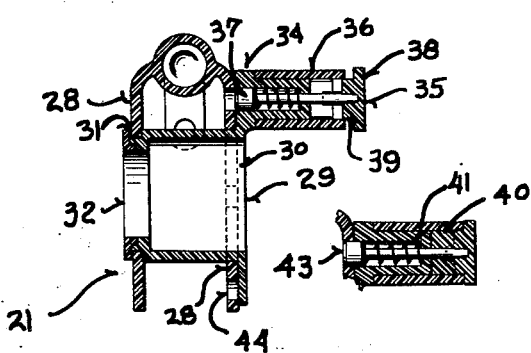
FIG. 5.
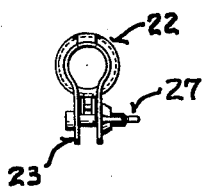
FIG. 4
INVENTOR.
RALPH SPARTZ
BY
ATTORNEY

United States Patent Office 2,817,177
Patented Dec. 24, 1957

2,817,177
REEL

Ralph Spartz, Milwaukee, Wis.

Application May 13, 1955, Serial No. 508,017

2 Claims. (Cl. 43—18)

This invention relates to improvements in a reel and more particularly with a reel of the type used in connection with fishing and fishing equipment. The present invention provides a novel and economical reel which may be stored very easily and subsequently assembled by the operator to form a fish pole and reel whenever desired.

An object of the invention is to provide a small, economical reel assembly having a means for connecting the same to the end of a pole to thereby supply a practical fishing pole with the advantage of being able to wind the line onto the reel assembly rather than wind the line around the pole when the fishing pole assembly is not used.

Another object of this invention is to provide a reel assembly which can be easily mounted on the end of the fishing pole without damaging or bending the fishpole. This type of mounting further permits strengthening the tip end of the pole when the assembly is properly mounted.

Still another object of this invention is to provide a unique assembly for a fishing reel which permits use for "hand-line" fishing as well as for mounting upon the end of a fishing pole.

With the above and other objects in view, the invention consists of the improved reel, and all of its parts and combinations, as set forth in the claims, and all equivalents thereof.

In the drawing accompanying and forming a part of this specification, wherein is shown one embodiment of the improvement for a reel, and wherein like characters of reference indicate the same parts in all of the views:

Fig. 1 is a side elevational view of the invention as mounted on the end of a fishing pole and ready for use by the operator.

Fig. 2 is an actual size, side elevational view of the device.

Fig. 3 is a cross-sectional view of the reel portion of the invention taken along lines 3—3 of Fig. 2.

Fig. 4 is an additional cross-sectional view of the handle and lock mechanism of the device showing the locking pin urged to its locking position.

Fig. 5 is an end view of the mounting means for the device.

Referring more particularly to the drawing, the numeral 15 indicates generally the body portion of the reel device 16. The body portion 15 can very readily and economically be made of plastic of a suitable type; likewise, any lightweight metal or Bakelite could be used for the body portion 15. It is important in manufacturing the device that whatever materials the various parts be made from they must be relatively light in weight although strong enough to withstand considerable abuse and direct blows of various sorts.

The elongated hollow body portion 15 has adjacent its closed end 17 an extension 18 with an aperture 19 therein which permits the extended line from the reel 21 to pass through, as shown in Fig. 1. Adjacent the opposite end 22 of the body portion 15 is located the mounting mechanism 23. This mechanism 23 is located as shown in Figs. 2 and 5 and comprises a metal clamp substantially U-shaped in cross-section both at its mounted end 24 and its mounting end 25. The mounted end 24 embraces securely the body 15 of the device and by means of a screw 26 or other suitable structure locks the mounting mechanism 23 to the body portion 15. A wing-nut 27 is provided for mounting the invention on the fishing pole, as will be later described.

Fork-like extensions 28 projecting parallel to one another serve to mount in rotatable position the reel 29. The body portion 30 of the reel 29 fits into the apertures provided in the extensions 28 and is held in position by the shoulder portion 31 of the locking ring 32. It is understood that the reel portion 30 together with its handle portion 34 is free to rotate in either direction unless the locking mechanism 35 is set in position to prevent any rotational motion whatsoever.

The handle 34 of the reel 29 is formed integrally with the body portion of the reel 29; however, a slip cylindrical portion 36 is provided to more easily permit winding or unwinding the line on the reel 29.

It is to be noted that the locking mechanism provided for in the handle portion 34 of the device consists of a spring urged locking pin 37 which is secured to the knob end 38 of the handle 34. This knob-end 38 when rotated about its axis 90° degrees from the position it is in in Fig. 3 permits the extension 39 thereof to fit into the complementary channel 40 formed in the cylindrical portion 41. It is the understanding that extension 39 and channel 40 are provided to accommodate each other to permit the locking pin 43 to project from the rotatable portion of the reel into the body portion of the device. A number of apertures 44 are provided to easily permit locking the reel to prevent winding or unwinding of the fishing line.

The invention in having its hollow body portion 15 permits the use of a cane pole without damaging or weakening of the already somewhat fragile end of the pole. Actually the device strengthens the limber end of the cane pole to which it is there attached. However, any type of a pole can be used with the invention. It is further obvious from the descriptions and drawing that upon tightening the wing-nut 27 the device 16 is adequately secured to the cane pole. A device of this type when made of suitable plastic weighs less than three ounces and thus can be very easily carried in a person's pocket, or stored in a fishing tackle box without any inconvenience and without any fear of leaving a fishing line or hook exposed around a cane pole as is the present practice when fishing with a cane pole and line.

Further, the device could be used without any pole or extension and be more easily maneuverable in a boat than a line without any sort of reel. After reading the above description and viewing the drawing of the invention it will be obvious to fishermen that such a device is practical, economical and still more important, usable.

The specific illustrations and corresponding description are used for the purpose of disclosure only, and various changes may be made therein without departing from the spirit of the invention. All of such changes are contemplated as may come within the scope of the claims.

Having thus so described the invention, what I regard as new and desire to secure by Letters Patent is:

What I claim as my invention is:

1. A reel structure comprising, an elongated hollow body portion adapted to accommodate in the hollow portion thereof one end of a pole, a pair of substantially parallel reel mounting arms projecting from said body portion and having apertures therein, a reel mounted in said apertures for rotating movement therein, said reel comprising a body portion rotatably mounted within said apertures and having a shoulder portion thereof juxtaposed with one side of one of said reel mounting arms and a locking ring joined with said body portion of the reel and having a shoulder portion thereof juxtaposed with the other side of said reel mounting arm to rotatably lock said reel in assembled relation with said arms, a handle formed with said reel for rotating the same, and means adjacent one end of the body portion for removably mounting the reel structure on said pole, said means comprising a pressure gripping structure adapted to embrace a portion of the end of the pole when the reel structure is in proper position.

2. A reel structure comprising, an elongated hollow body portion having an open end and a closed end, said body portion being adapted to accommodate in the hollow portion thereof one end of a pole, a pair of substantially parallel reel mounting arms located intermediate the ends of said body portion and projecting therefrom and having apertures therein, a reel mounted in said apertures for rotating movement therein, said reel comprising a body portion rotatably mounted within said apertures and having a shoulder portion thereof juxtaposed with one side of one of said reel mounting arms and a locking ring joined with said body portion of the reel and having a shoulder portion thereof juxtaposed with the other side of said reel mounting arm to rotatably lock said reel in assembled relation with said arms, a handle formed with said reel for rotating the same, means adjacent the open end of the body portion for removably mounting the reel structure on said pole, said means comprising a pressure gripping structure adapted to embrace a portion of the end of the pole when the reel structure is in proper position, and a projection of the body portion located adjacent the closed end of the hollow body portion, said projection having an aperture therein.

References Cited in the file of this patent
UNITED STATES PATENTS

| | | |
|---|---|---|
| 2,261,629 | Murphy | Nov. 4, 1941 |
| 2,608,015 | Peterson | Aug. 26, 1952 |
| 2,639,869 | Levine | May 26, 1953 |